United States Patent [19]

Manganaro

[11] Patent Number: 5,181,538
[45] Date of Patent: * Jan. 26, 1993

[54] MULTIPLE STREAM FLUID MIXING AND DISPENSING APPARATUS

[76] Inventor: Paul R. Manganaro, P.O. Box 535, Coopersburg, Pa. 18036

[*] Notice: The portion of the term of this patent subsequent to Feb. 12, 2008 has been disclaimed.

[21] Appl. No.: 654,197

[22] Filed: Feb. 11, 1991

Related U.S. Application Data

[63] Continuation-in-part of Ser. No. 448,639, Dec. 11, 1989, Pat. No. 4,991,625.

[51] Int. Cl.$^5$ ............................................. F16K 11/18
[52] U.S. Cl. ................................ 137/607; 251/26; 251/43; 251/46
[58] Field of Search ................. 137/606, 607; 251/26, 251/43, 46, 61.1

[56] References Cited

U.S. PATENT DOCUMENTS

| | | | |
|---|---|---|---|
| 3,249,120 | 5/1966 | Kozel | 251/45 X |
| 4,189,792 | 2/1980 | Veach | 137/607 X |
| 4,284,260 | 8/1981 | Baranoff | 251/45 |
| 4,683,907 | 8/1987 | Brugnoli | 251/45 X |

FOREIGN PATENT DOCUMENTS 2186611  1/1974  France ........................... 251/45

Primary Examiner—Stephen M. Hepperle
Attorney, Agent, or Firm—Sanford J. Piltch

[57] ABSTRACT

An improved multiple stream, fluid mixing and dispensing apparatus for automatically regulating flow rate for one or more preset fluid flows including a plural station, fluid flow rate console assembly adapted for cooperating with the standing hydraulic pressure of a dual fluid supply means with a variable effluent flow rate regulator interposed in each of the main supply conduits and associated controller means for presetting the flow rate through each regulator and for determining both the degree of mixing and the incidence of fluid flow to be provided from each supply conduit to the exit conduit. The apparatus being specially adaped for permitting pneumatic operation.

10 Claims, 11 Drawing Sheets

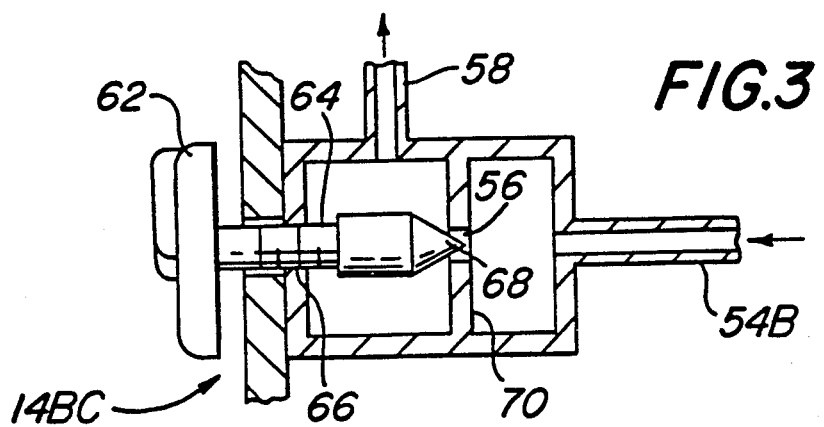
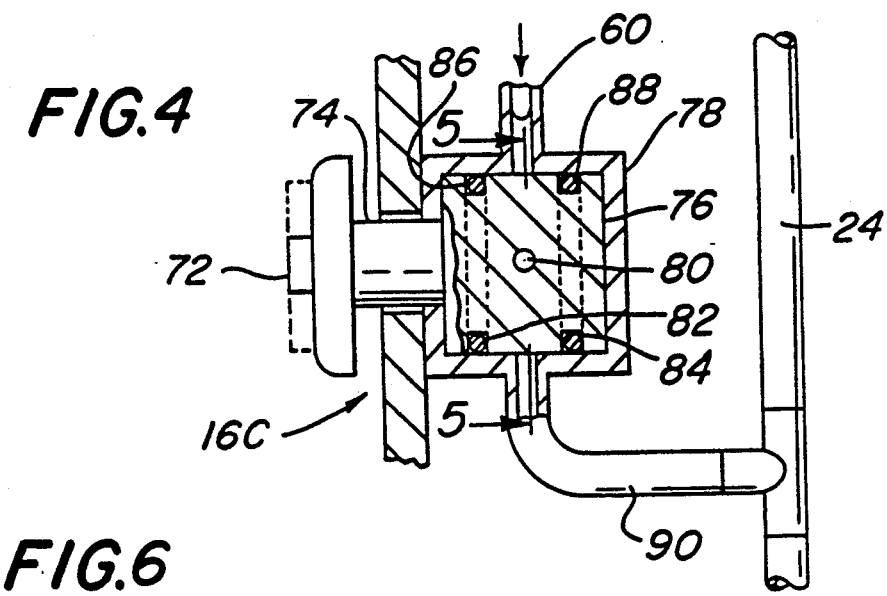
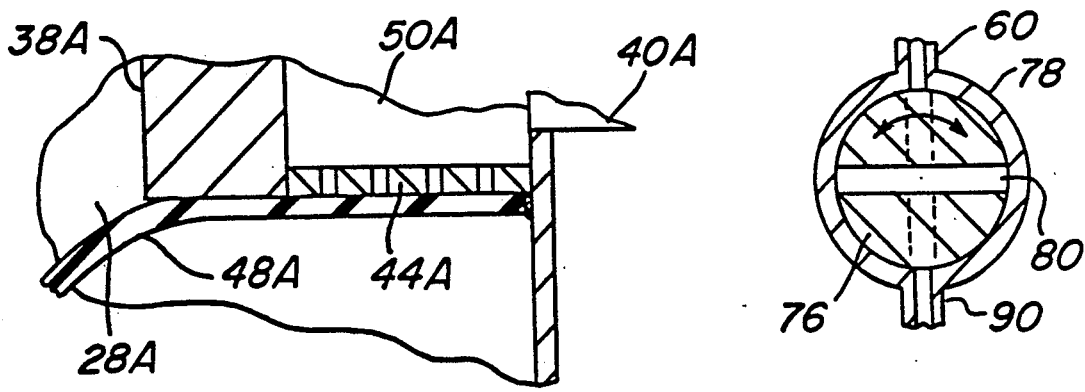

MULTIPLE STREAM FLUID MIXING AND DISPENSING APPARATUS

CROSS REFERENCE TO OTHER APPLICATIONS

This is a continuation-in-part of prior copending application Serial Number 07/448,639, filed Dec. 11, 1989, now U.S. Pat. No. 4,991,625.

TECHNICAL FIELD OF THE INVENTION

This invention relates to a touch-actuated fluid dispensing apparatus providing plural fluid streams on demand.

BACKGROUND OF THE INVENTION

Systems exist for controlling the temperature and flow rates of fluids for various purposes. Systems also exist for mixing two miscible fluid streams to obtain a desired working temperature or other combination of physical properties. Push-button mixing valves are known to have been used for such purposes. In residential water uses, the flow rate and temperature of the mixed stream must be set and balanced each time a user steps up to the faucet for a special need. There are everyday situations where a system tailored to provide residential water for a particular application would be most convenient, especially if such a tailored condition fluid stream could be made available at the touch of a knob.

A primary objective of the present invention is to provide a control console that is simplified and compact and will, on demand, provide any of a number of discrete fluid streams, each having a predetermined temperature and flow rate.

Another object of the invention is to provide a device having a number of dial-actuated elements, controlling fluid flow which have been preset for a variety of use conditions.

Still another object is to provide a regulator system whereby a fluid of the same mixture and temperature is delivered each time through the common outlet when a specific ON-OFF knob is actuated.

Yet another object of the invention is to provide calibrated settings for the main flow controllers which describe a range in the liquid outflows that has been established for a specific industrial purpose.

A still further object of the invention is to standardize the fluid output requirements by building in compensating means for variations in incoming feed rate and line pressures.

Other objects will appear hereinafter.

SUMMARY OF THE INVENTION

The present invention is an improved multiple stream, fluid mixing and dispensing apparatus, displaying advantages over prior structures and a versatility as described above and following. The present invention includes an alternate means for effecting the vital main flow stream regulation.

The first embodiment of the invention comprises a plural station, fluid flow rate and temperature control console adapted for cooperating with the standing hydraulic pressure of a dual temperature fluid supply means.

This embodiment of the present invention comprises two main fluid supply conduits, a single fluid exit conduit interruptably connectable to both of said main supply conduits, a variable effluent flow rate regulator interposed in each of the main supply conduits, bypass fluid supply conduits operably connected to each of the main fluid supply conduits and to the interposed flow rate regulator, an ancillary fluid outlet conduit connected to said regulator serving as a signal control fluid supply means, and at least one or more associated controller means for presetting the flow rate through each regulator and determining both the degree of mixing and the incidence of the fluid flow to be provided from both of said supply conduits to the exit conduit.

Each of the flow rate regulators has a rigid impermeable main chamber connecting a first section with one of the main fluid supply conduits and with the fluid exit conduit. Also the bypass fluid supply conduits are operably connecting between each of the main supply conduits and a second section of the main chamber of the interposed flow rate regulator.

The main chamber is provided with a first fluid valving means comprising an internally disposed, perforated support means upstream of said fluid exit conduit, and a flexible fluid-impermeable membrane securely arranged across said main chamber separating said first and second sections thereof and adapted to seat sealingly, either fully or partially, over said perforated support means. The membrane is responsive to the differential pressures created on the opposing sides of the membrane by the dissimilar flow pressures emanating from the fluids in the main fluid supply conduit and the bypass fluid supply conduit.

An associated controller means is adapted for setting the regulator main flow rate and includes a first multisetting flow valve means disposed downstream in the signal control fluid supply means. A second valving means is connectably disposed downstream of the first multisetting valve for "ON" or "OFF" modes of operation. The second valving means is also connected to a companion second multisetting flow valve means for the other signal control fluid supply means of the other main fluid supply and also to the main exit conduit. This second valving means serves as a common flow control valve for the mixed fluid streams.

A second embodiment of the present invention comprises the plural station flow control console described above including all the described assemblies and components, except the configuration of the variable effluent, flow rate regulator interposed in each of the main supply conduits. An alternate means for the regulator assembly is one in which the main chambers have an internally disposed perforated plate means located in a wall intermediate and separating the main fluid supply and fluid exit conduits. The intermediate wall along with the perforated plate means forms a cylindrical compartment in cooperation with the main chamber sidewall enclosing a disk-like piston adapted to reciprocate in said cylindrical compartment. The piston moves between full-flow and no-flow positions relevant to one or more outflow ports in said perforated plate means, with the position of the piston being responsive to the differential pressures created on the opposing planar surfaces of said piston by the dissimilar flow pressures emanating from the main fluid supply conduit and the bypass fluid supply conduit.

Each of the flow rate regulators is provided with a manually adjustable needle valve located in the bypass fluid supply conduit for calibrating the bypass fluid flow in accordance with pressure differences occurring in the supply fluid passing therethrough to the main chamber of the regulator. Each of the regulators also includes at least one associated controller means downstream for setting the fluid flow rate and temperature of the mixed fluid flow.

The flexible membrane is composed of an elastomeric material which is resistant to high temperature fluid contact and to cyclical and flexible seating. The membrane is also responsive to multiple pressure differentials exerted thereon. The disk-like piston is composed of a plastic material resistant to high temperature fluid contact and to reciprocating frictional contact. The piston is also responsive to multiple pressure differentials exerted thereon.

The associated controller means for each embodiment includes first and second multisetting flow valve means comprising manually adjustable, needle-throttle and orifice type valves with plural settings ranging from minimal signal fluid flow to full signal fluid flow. The associated controller means also includes a second valving means with a manual control knob for rotating the valve body between full-flow and no-flow modes on demand.

BRIEF DESCRIPTION OF THE DRAWING

For the purpose of illustrating the invention, there is shown in the drawings forms which are presently preferred; it being understood, however, that the invention is not limited to the precise arrangements and instrumentalities shown.

FIG. 3 is a sectional view of the flow setting control assembly of the present invention, taken along line 3—3 of FIG. 1.

FIG. 4 is a sectional view of the ON-OFF flow valve assembly of the present invention, taken along line 4—4 of FIG. 1.

FIG. 5 is a sectional view of the cylindrical valving portion of the ON-OFF flow valve assembly, taken along line 5—5 of FIG. 4.

FIG. 6 is an enlarged fragmentary view of the valving means for the main fluid flow regulator of FIG. 2.

DETAILED DESCRIPTION OF THE PREFERRED EMBODIMENTS

The following detailed description is of the best presently contemplated modes of carrying out the invention. The description is not intended in a limiting sense, but is made solely for the purpose of illustrating the general principles of the invention.

Figure 1:
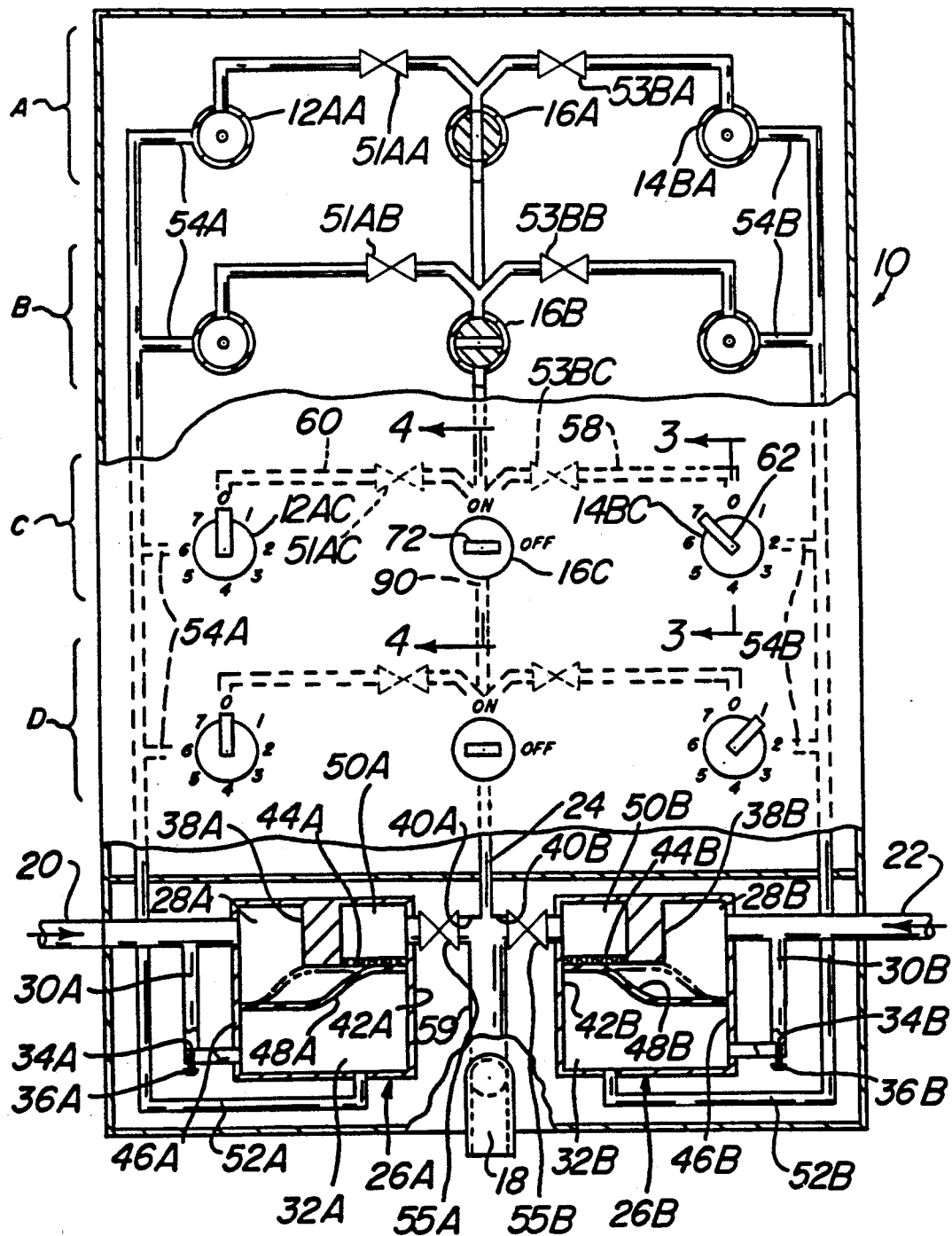
FIG. 1 is a partially broken away front view of the mixing console of the present invention showing the internal operating elements of the console.

Referring now to the drawings in detail, wherein like numerals represent like elements, there is depicted in FIG. 1 the aforedescribed dial functions, their integral associated controller valves, associated piping, and the common flow rate regulator for the A gas and B gas main lines to be described. The two gas mains enter identically configured flow rate regulators, 26A and 26B, respectively. The "A" and "B" characters as used herein indicate connections to the "A-gas" and "B-gas" main supplies and control regulators, and are used for ease of invention.

Looking first to the first regulator 26A, main fluid supply conduit 20 connects with an inlet chamber 28A of the regulator 26A. A bypass conduit 30A connects between inlet line 20 and the main control chamber 32A of regulator 26A. Disposed in the bypass conduit 30A is a needle-regulated, constrictable orifice 34A, the aperture of which is determined by the adjustable setting of the threaded needle. The aperture setting of the bypass valve 36A is calibrated and set upon initial erection of the control panel and link up with the site plumbing system. This valve 36A is used to compensate for the varied pressure heads in various locales. The aperture position will provide a fairly uniform inlet fluid pressure (generally below the inlet line pressure due to inherent pressure drop) to the control chamber 32A.

Regulator 26A is provided with an inwardly projecting, partial partition wall 38A located intermediate the main inlet 20 and main outlet conduit 40A. Securely mounted between partition wall 38A and the control chamber distal wall 42A is a perforated rigid support means 44A, which will permit fluid communication between the main inlet 20 and outlet conduit 40A and provide support and seating of a valving means, flexible membrane 48A. Located substantially horizontally between opposing side walls 42A and 46A, and secured intermediate of their vertical length is the flexible, liquid and gas impermeable membrane 48A. This membrane is adapted to move between a full closure position against the perforated support means 44A (shown in phantom) or to a partially open position shown in FIGS. 1 and 2.

The differential fluid pressures exerted on opposing sides of the membrane 48A will determine the valving effect and, thus, how much fluid moves through the regulator 26A via outlet chamber 50A and conduit 40A to the common outlet 18. Consequently, the fluid volume resident on the underside of membrane 48A can escape only through the return outflow line 52A linked to the signal conduits 54A.

The signal conduit 54A is operatively linked to each "A"-side valve means and is also operably connected to outflow line 52A of "A" fluid flow regulator 26A as shown in FIG. 1. Similarly, the "B" signal conduit 54B is connected through the line 52B with the flow rate regulator 26B. (Elements in regulators 26A and 26B ending with the indicators "A" and "B" have identical functions within each regulator and further description is deemed unnecessary.)

In regard to using the present apparatus for a gas mixing system (pneumatic activation), the basic requirement is that the both gases have an approximately balanced static pressure. Such balanced pressure, coupled with selectively positioned check flow valves should preclude undesired mixing of the gases.

The elements which are described in connection with each side of the controller and with each group of associated flow control preset valve means are identified in accordance with, first the side of the controller and, second the group of associated valve means (e.g. check valve 53BA is on side B and is associated with group A). With further specific reference to FIG. 1, and the stated check valve needs, a pair of check valves 51AA and 51AB and 53BA and 53BB are located on each side of central flow valve 16A and central flow valve 16B, respectively. Also, check valves 55A and 55B located on each side of the main gas effluent tubes or outlet conduits 40A and 40B. The common main 59, extending between the confluence of conduits 40A and 40B and the common outlet 18, functions as a mixing chamber for the two gases, A & B, prior to effluence through outlet 18.

The configuration of one of the dialable valving assemblies is better shown in the sectional view of FIG. 3. There is shown a threaded needle-type valve, 14BC, which controls the aperture of its variable orifice 56. The "0" setting of the valve 14BC indicates no fluid flow through the assembly and a "7" setting on said valve would correspond to maximum fluid flow through the valve. The upper oriented outflow line 58 of valve 14BC joins with opposing outflow line 60 of valve 12AC in a Y-union as shown in FIG. 1. The commingling signal fluid flows from the valves 12AC and 14BC enter the associated central on-off flow valve 16C. The valve 16C is depicted in the no-flow mode, while the uppermost central on-off valve 16A (FIG. 1) is depicted in the alternate combined stream flow mode. The intervening central on-off valve 16B is closed.

The dial-settable valve assembly, such as control valve 14BC, is adjusted as follows. As shown in FIG. 3, the external manual knob 62 is adapted to be rotated to any of eight settings (0 to 7). Due to the moving engagement of its threaded shaft 64 within tapped valve wall 66, a single clock-wise rotation (360°) of knob 62 will move the tapered needle cone 68 along an axial path into and out of intermediate orifice 56 which is located in axial alignment through the wall 70 separating the inlet and valve chambers of the valve body. This movement of the knob 62 reciprocally moves the needle cone 68, and correspondingly the valve 14BC, between closure and full flow settings.

As depicted in FIG. 3, the needle cone 68 is partially spaced apart from orifice 56. For example, if the dial setting of the knob 62 were at "3", this setting would permit fluid from signal supply line 54B to enter valve 14BC and exit via conduit 58 at a particular flow rate. Connection with the central on-off valve 16C exerts pneumatic pressure whether or not the latter valve is in the flow position. The fabrication and calibration of such digitally modulated valves is known to those having skill in the valving art and further description is not deemed necessary.

With reference to FIG. 4, there is shown a sectional view of the centrally disposed on-off valve 16C (shown in the no flow mode). This corresponds to the observed "off" setting of the corresponding knob 72 in the fluid dispensing system on the front panel of the console. The pinned shaft 74 of knob 72 is secured to a cylindrical valve body 76 which is rotatably enclosed by casing 78. A single diametrically aligned passage 80 through the center of the valve body is provided, and is positioned (as shown) so as to prevent fluid flow through on-off valve 16C. The cylindrical periphery of valve body 76 is provided with a pair of spaced-apart, circumferential grooves 82, 84 which straddle passage 80. Each groove carries a resilient elastomeric O-ring 86, 88 for insuring the hermetic sealing of the valve. No fluid will flow from the confluence of the outflow lines 58 and 60 to outlet conduit 90, so long as the knob 72 is maintained in the depicted alignment of passage 80. Rotation of external knob 72 to the vertical position (as shown in phantom) would rotate passage 80 into vertical alignment with the confluence of outflow lines 58 and 60 and outlet conduit 90 and permit a mixed fluid flow in accordance with the fluid flow settings of the valves 12AC and 14BC.

The sectional view of FIG. 5 more clearly depicts the internal configuration of the on-off valve 16C and the passage 80. This passage is shown in the horizontal (non-flow) mode preventing fluid from exiting to its outlet conduit 90, which is connected to the common outlet conduit 24. The valve means is easily rotatable 90° to the flow mode by turning knob 72 (FIG. 4).

The fragmentary sectional view of FIG. 6 depicts the valving means for the main regulator 26A in the alternate position of the flexible membrane 48A being fully closed. In this configuration the valving means 48A blocks all main fluid flow through main outlet conduit 40A to the common outlet or faucet 18. Membrane 48A is shown in sealing contact with perforated rigid support means 44A, blocking fluid flow from inlet chamber 28A into exit chamber 50A, thus precluding any fluid flow through main outlet conduit 40A and check valve 55A to common outlet 18.

Figure 2:
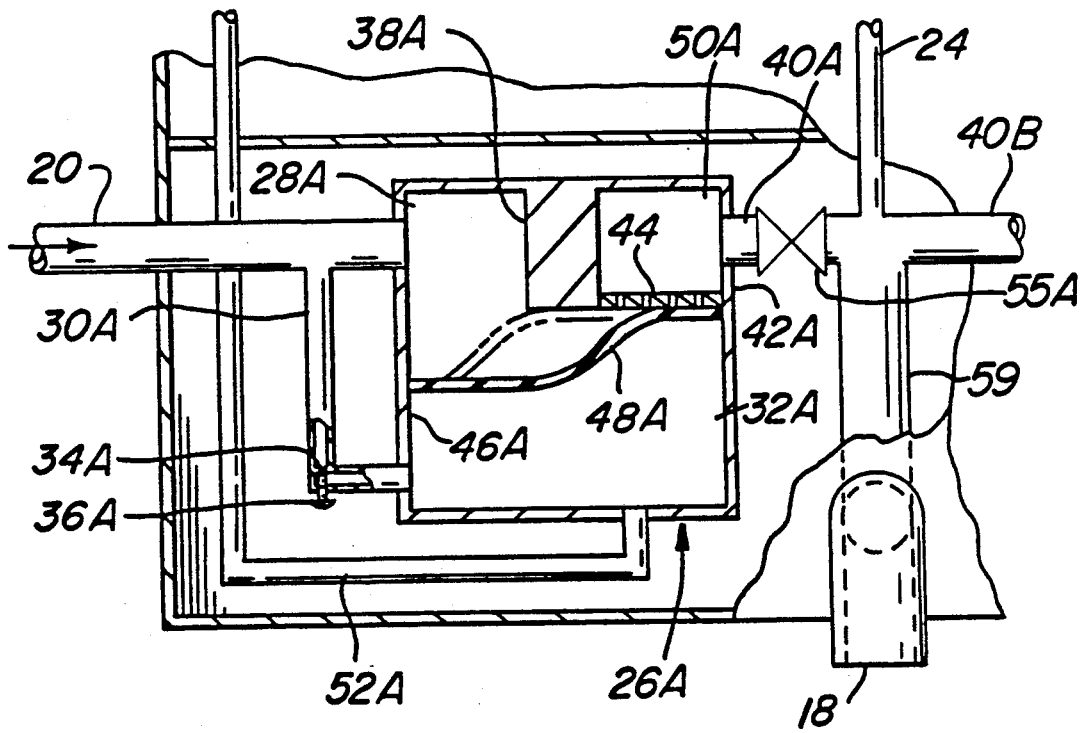
FIG. 2 is an enlarged fragmentary view of the fluid flow regulator assembly of the lower left quadrant of FIG. 1.
Figure 7:
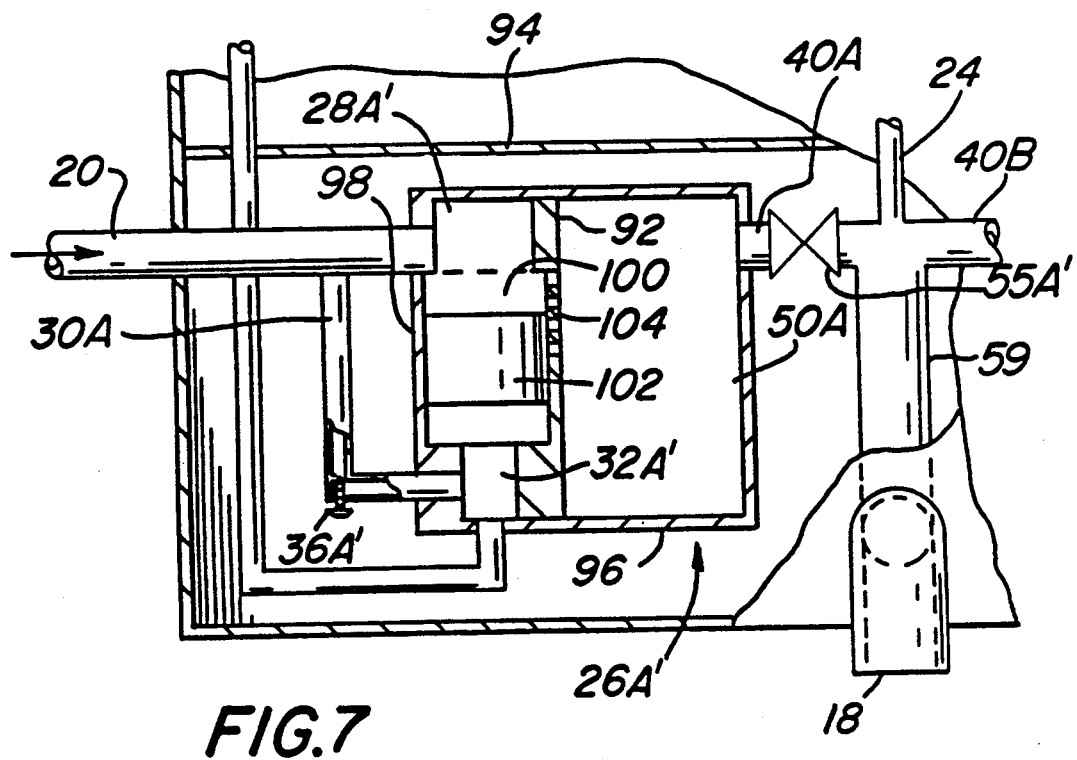
FIG. 7 is an alternate embodiment of the main fluid flow regulator assembly of FIG. 2.

An alternate or second embodiment of the flow regulator assembly of FIG. 2 is depicted in FIG. 7. An A' will be used to denote similar elements in this embodiment to those described in the first embodiment. The main inflow and outflow conduits 20 and 40A' are identically configured as in the first embodiment, as is the inflow bypass conduit 30A' with its adjustable needle valve 36A' for modulating fluid pressure (static) on the main fluid supply. The partition wall 38A, horizontal perforated support means 44A and membrane 48A of the first embodiment (FIG. 2), have been supplanted by a piston-type, valving sub-assembly that is the functional equivalent of the first embodiment of the invention in regulator 26A.

An intermediate curvilinear partition wall 92 bridges the upper and lower walls 94 and 96 of regulator 26A'. The partition wall 92 and regulator side wall 90 define the cylindrical main chamber 100 for a cylindrical piston valving means 102. The upper section of the partition wall 92 has multiple perforations 104 (similar to the perforations of support means 44) serving as flow ports. The flow ports 104 permit fluid flow between the inlet chamber 28A' and the larger outlet chamber 50A'. Piston 102, as controlled by the fluid pressure in the valve chamber 32A', permits a controlled fluid flow from the main fluid supply conduit 20 through the inlet chamber 28A', the flow ports 104 and to the outlet chamber 50A'. Fluid moving through needle valve 36A' to valve control chamber 32A' biases the piston upwardly to partly or fully close the flow ports 104. At the upper end of its travel, piston 102 blocks all fluid flow from inlet chamber 28A' (as shown by the lines drawn in phantom).

Just as with the flexible membrane valving means 48A of the first embodiment, the respective inflow and outflow rates through the conduits 20 and 40A' will establish an intermediate or equilibrium position for the piston 102 between first and second sections of the main chamber 100 in accordance with the differential fluid pressures occurring in inlet chamber 28A' and valve chamber 32A' This, in turn, will modulate the volume of outflow or flow rate of the regulator 26A' to the faucet-connected conduit or fluid mixing chamber 59. The associated dials on the console 10 will determine the flow rate and temperature of liquids or the flow rate and proportionate mixing of gases to the faucet 18 via main outlet conduit 40A' and mixing chamber 59.

Referring again to FIG. 1, in operation, when one of the central on-off valves 16, is in the off position (as shown in Group C), there is no fluid flow through valve 16C to the central signal flow common outlet conduit 24 connecting directly with mixing chamber 59 and common outlet 18. At the same time, as to upstream redialable flow rate controller valves 12AC and 14BC, there would be no flow there as well. This set condition further arrests flow through the common laterally located signal conduits 54A, 54B which are in fluidic communication with the adjustable, fluid regulators 26A and 26B, respectively. As to the left side piping of FIG. 1, the lack of flow into signal conduit 54A creates a comparable reverse fluid pressure on the opposing faces of membrane 48A (an equilibrium), which will cause the membrane to remain seated upon support means 44A (shown in phantom), impeding any fluid flow from outlet chamber 50A to the common outlet 18.

As a corollary, if presettable valve 12AC on signal flow line 54A were fully opened, reducing flow to main chamber 32A, and the companion downstream on-off valve 16C is set in the flow-through mode, then gas pressure entering the inlet chamber 28A of flow regulator 26A will create a downward pressure differential on the membrane 48A, separating the membrane from the support means 44A, permitting the pressurized flow from the main supply conduit 20 through regulator 26A to the common outlet 18.

Plural intermediate flow rates from the common outlet 18 are available from the presetable valve groups A-D with adjustments to each of the valves in the respective groups located on the control panel 10. This is done by manually adjusting the knobs of the valves in the respective groups, e.g. valves 12AC and 14BC (as described above in connection with FIG. 1). The signal flow control valves 12, 14 and 16 are more convenient to set, rather than attempting to control flow in bypass conduit 30 using bypass valve 36. The earlier explained calibration of valve 36 provides for full valve control of the fluid flow by signal control valves 12, 14 and 16. The predetermined selection is made by a dial setting between "0" (no flow) and "7" (maximum flow). Recall that the bypass conduit valve 36A aperture setting was preferably established at the time of initial installation of the control panel and should not be modified.

By way of further example, referring to FIG. 1, if the dial associated with preset flow control valve 12 has been set at "3" (intermediate flow), while companion dial associated with preset flow control valve 14 has been left at "0" (no flow), upon moving central flow valve 16 to the "ON" position, fluid (liquid or gas) will flow from the regulator 26A through main outlet conduit 40A and the common outlet conduit 24, being limited only by the medium flow rate setting "3" on valve 12, as said valve setting directly controls the equilibrium point of the flexible membrane (valving means) 48A.

More specifically, the fluid outflow from regulator 26A, via the return outflow conduit 52A to the signal conduit 54A, which in turn is connected to open valves 12 and 16, creates a pneumatic pressure imbalance on the valving means flexible membrane 48A. This, at least partially, lifts the valving means 48A away from grating 44A and permits fluid flow between the inlet chamber 28A and outflow chamber 50A. As the dual flow rates through regulator 26A become stabilized, they will create an equilibrium opposing pneumatic pressures on the valving means flexible membrane 48A causing it to assume an intermediate position or configuration.

The main fluid flow will pass out of the main outlet conduit 40A, through checkvalve 55A, into mixing chamber 59 and out the common faucet 18 unimpeded until some manual intervention occurs at the dials. Should the appropriate central valve 16 be closed, return line flow through main control chamber 32A would stop and the pneumatic pressure buildup below the flexible membrane 48A would bias it to seat fully over grating 44A. Hence, rather quickly stopping fluid flow from the outlet 18. Regulator 26B functions in an identical manner and further description is deemed unnecessary.

Alternatively, should the central flow control valve (on-off) 16C be left open, but only the adjustable setting dial be moved back to "1" (a lesser flow rate) or forward to "5" (a higher flow rate), then the new pressure differential created on the flexible membrane 48A would modify the equilibrium position directly affecting the fluid flow rate through the regulator, altering it accordingly.

The following several embodiments are further constructions of fluid flow rate control valves of equivalent construction to the earlier described two embodiments. These different equivalent constructions are described to show other interrelationships of specific structural elements which, when joined and operated together, have the same, if not identical, result.

Figure 8:
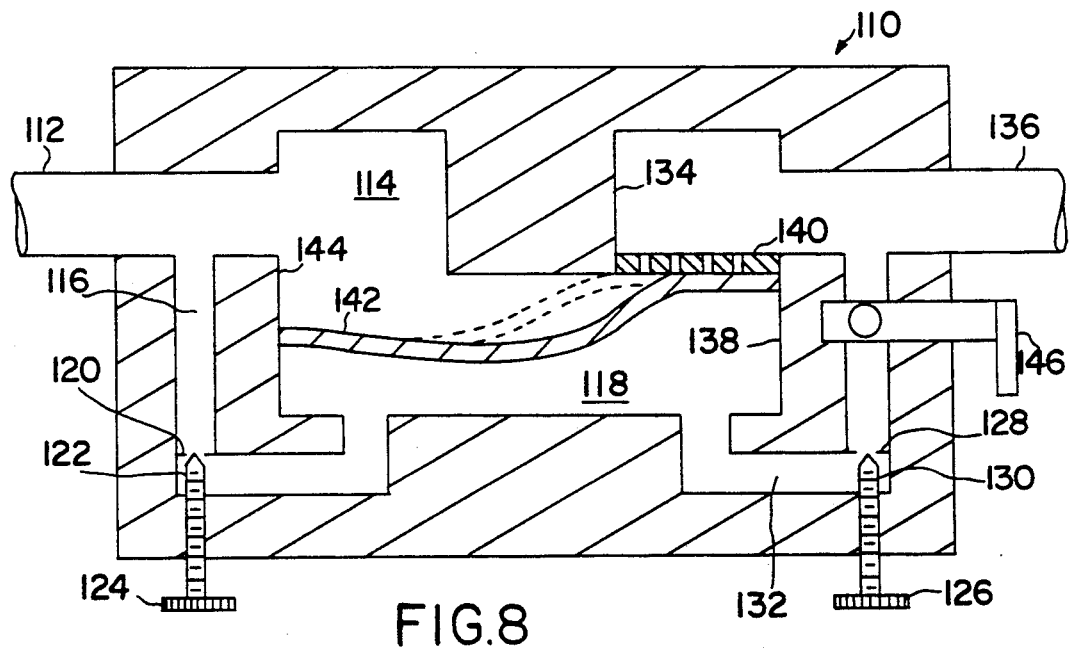
FIG. 8 is another embodiment of the main fluid flow regulator assembly employing a pair of needle-regulated, adjustable orifices for controlling the main fluid flow and a flexible sealing membrane/grate valving means.

Another embodiment of a flow regulator is shown in FIG. 8 in which regulator 110 is configured quite similarly to that shown in FIG. 2. The main fluid supply conduit 112 connects with an inlet chamber 114 of the regulator. A bypass conduit 116 connects between main fluid supply conduit 112 and the main control chamber 118 of regulator 110. Disposed upstream in the bypass conduit 116 is a first needle-regulated, constrictable orifice 120, the aperture of which is determined by the adjustable setting of the threaded needle 122. A bypass control valve 124 is located in the bypass conduit 116 upstream of control chamber 118. Bypass control valve 124 serves the same calibration purpose as earlier described valve 36A. A signal flow valve 126, also having a needle regulated orifice 128 and threaded needle 130 is located downstream of control chamber 118 in signal conduit 132. Signal flow valve 126 serves the same purpose as control valve 14 in the earlier described embodiments.

Regulator 110 is also provided with a depending partial partition wall 134 located intermediate of the main supply conduit 112 and main outlet conduit 136. Between partition wall 134 and distal chamber wall 138 is perforated rigid support means 140, permitting fluid communication between main supply conduit 112 and main outlet conduit 136. The support means 140 also provides partial support for seating of the valving member 142 to be described more fully below.

As in FIG. 2, located between and secured to opposing side walls 144 and 138 at points intermediate of the length and at the junction with the support means, respectively, is a flexible, fluid-impermeable membrane 142. The flexible membrane or valving means 142 is adapted to move between a partly closed position (as shown) against support means 140 or to a fully closed position (as shown in phantom).

Finally, located in the signal conduit 132, preferably just before its juncture with the main outlet conduit 136, is an ON/OFF type signal control valve 146. This valve, in conjunction with the preset signal flow valve 126, serves to activate the entire signal flow control of the regulator 110, as earlier described in connection with control valve 16 in the prior embodiments. The throttling action of the signal flow valve 126 on the bypass fluid flow through signal flow valve 138 opens or closes the main fluid flow by affecting the equilibrium point of the valving means 142 until the main flow of the regulator 110 is to be activated as described in connection with the earlier two embodiments.

Figure 9:
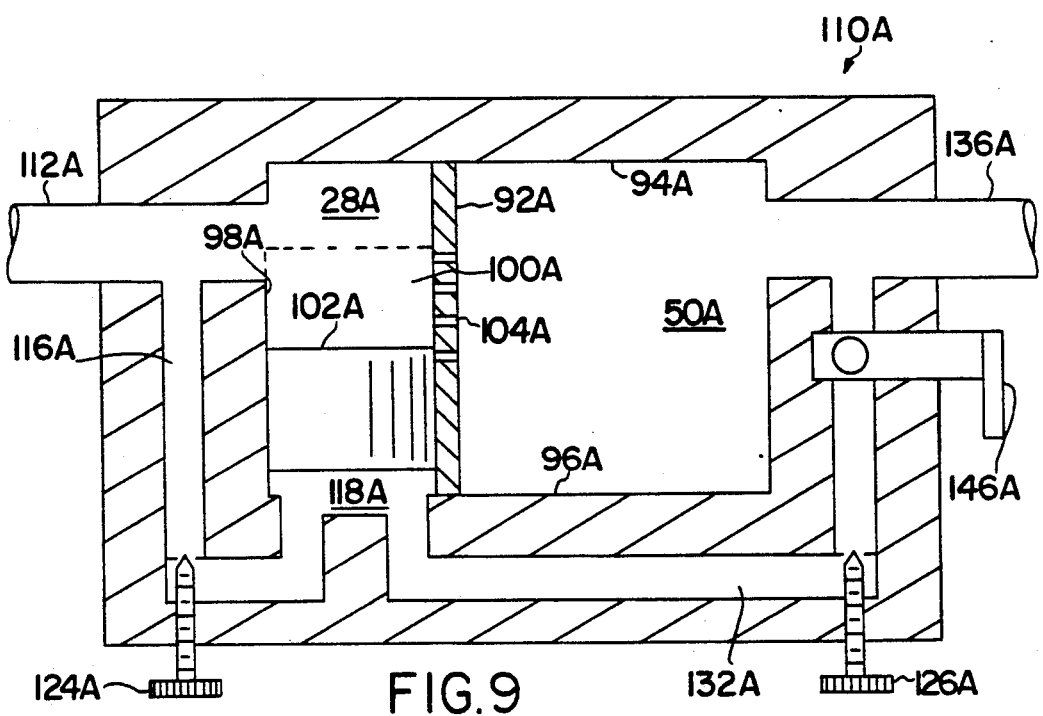
FIG. 9 is another embodiment of the main fluid flow regulator assembly employing a pair of needle-regulated, adjustable orifices for controlling the main fluid flow.

The embodiment depicted in FIG. 9 is structurally configured similarly to that of FIG. 7, with the exception of the addition of needle valves 124A, 126A, and signal flow control valve 146A. The character A will be used to denote the elements here identical to elements of the referenced embodiments for the flow regulator 110A. The main inflow and outflow conduits, 112A and 136A, are identically configured as in the earlier embodiment, as is the inlet bypass line 116A with a first adjustable needle valve 124A, for modulating bypass fluid pressure from the main fluid supply. The flexible membrane has been supplanted by a piston-type, valving sub-assembly 102A that is the functional equivalent of the earlier embodiment [FIG. 7].

An intermediate curvilinear partition wall 92A bridges the upper and lower walls 94A and 96A of regulator 110A. The inner partition wall 92A and opposing inner side wall 98A define the cylindrical main chamber 100A for piston 102A. The upper section of partition wall 92A has multiple perforations 104A (similar in size and number to the perforations 104 of FIG. 7) serving as outflow ports from the main chamber 100A. The ports 104A permit fluid flow between inflow chamber 112A and larger outflow chamber 50A. Piston 102A is partly controlled by bypass fluid pressure in the main control chamber 118A, thereby regulating the fluid flow from the main supply conduit 112A, through inlet chamber 28A and main chamber 100A, through outflow ports 104A and outlet chamber 50A, to outlet conduit 136A.

Fluid moving past first needle valve 124A to main control chamber 118A biases the piston or valving means 102A upwardly, to partly or fully close the flow ports 104A. At the upper reach of its travel, piston 102A will fully block fluid flow from inlet conduit 112A (as shown in phantom).

Just as with the flexible membrane valve of FIG. 8, the respective inflow and outflow rates will establish an equilibrium position for piston 102A (within the variable-sized chambers 118A and 100A), in accordance with the differential fluid pressures exerted on the two piston surfaces. The throttling position of needle valve 126A will determine the overall bypass fluid flow rate. Such flow, in turn, will modulate the overall outflow rate from the controller or regulator 110A of FIG. 9 to the mixing chamber 59 and outlet conduit 18 of FIG. 1.

Figure 10:
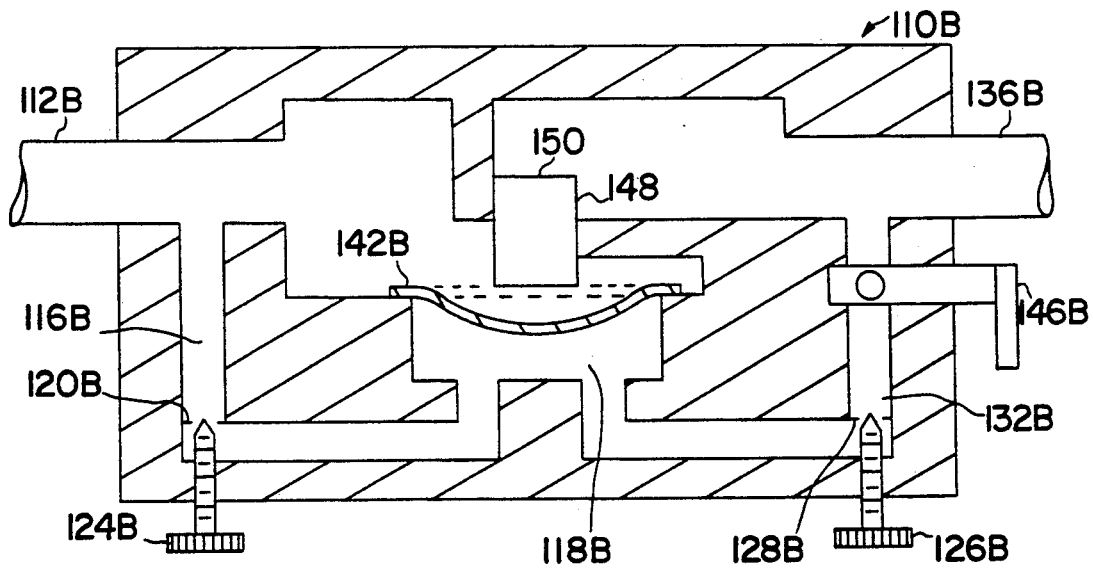
FIG. 10 is another embodiment of the main fluid (liquid/gas) flow regulator assembly employing a pair of needle-regulated, adjustable orifices and a flexible sealing membrane valving means.

Referring to FIG. 10, there is shown another variable effluent flow rate regulator 110B employing a flexible membrane as the main valving element. As with earlier figures, common elements will be denoted by successive letter character, in this case the character B. A main fluid outlet conduit 136B is provided with a hollow, rigid (preferably cylindrical) collar 148 that hermetically seals against the main flow outlet port 150, the transverse open end of collar 148. A flexible, fluid-impermeable membrane 142B seats intermittently, either fully or partially across the lower open end of the collar 148. The membrane 142B is responsive to the differential fluid pressures imposed on the opposing sides the membrane 142B from the main inlet chamber 114B and the main control chamber 118B. As in the earlier described embodiments, the pressure found in the main control chamber is directly controlled by the bypass control valve 124B permitting fluid (gas) to flow in the bypass conduit 116B.

As in the embodiment of FIG. 8, disposed in bypass conduit 116B is a first needle-regulated, constrictable orifice 120B, located upstream of control chamber 118B. A second companion constrictable orifice 128B is located downstream of control chamber 118B, with both serving to control the flow as earlier described. In the signal conduit 132B there is located a signal flow control valve 146B which serves to activate or inactivate the entire flow control system. With control valve 146B closed, the regulator 110B builds up pressure in the main control chamber 118B until the membrane 142B completely closes off the lower opening of the collar 148. When reactivation of the regulator 110B is needed, the valve 146B is opened and the pressure on the underside of the membrane 142B equalizes with the pressure on the opposing side coming away from the collar 148 and initiating fluid flow through the regulator.

Figure 11:
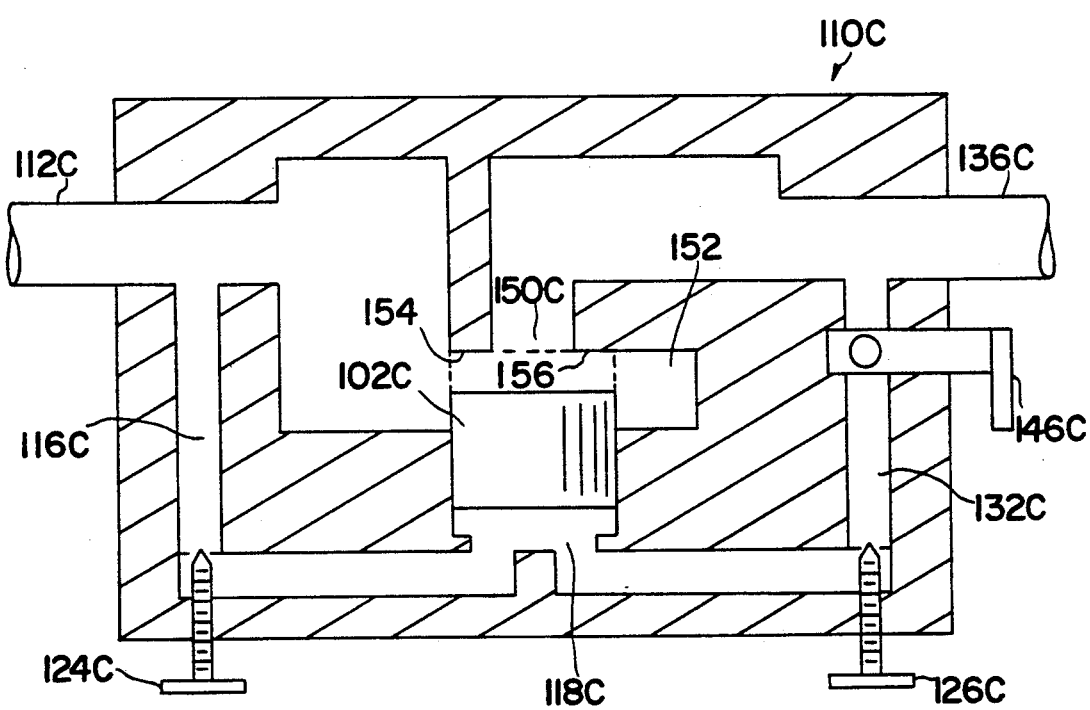
FIG. 11 is another embodiment of a fluid (liquid/gas) flow regulator assembly employing a pair of needle-regulated, adjustable orifices and a reciprocating free piston valving means.

Referring now to FIG. 11, there is depicted another variable effluent flow rate regulator 110C having a different flow rate controlling system. In this embodiment common elements having similar functions as in earlier embodiments are identified with the character C, as earlier noted. Main control chamber 118C takes the form of a cylindrical compartment having most of its sidewall enclosing a free piston 102C, which travels between a full-flow and a no-flow position (shown in phantom), relevant to the outlet orifice 150C. The upper portion of the control chamber is hollowed out about its circumference to radially define an annular passage 152. This passage 152 functions as part of the main fluid supply flow path during full and partial supply fluid flow. The enlarged chamber partial annulus 152 is also sealed off when the piston 102C is in the no-flow mode being seated against ledges 154 and 156.

As in the embodiment of FIG. 10, a pair of needle-regulated, constrictable orifices 124C and 126C are disposed in the bypass conduit 116C and signal supply conduit 132C, upstream and downstream, respectively, of main control chamber 118C. Also, in the signal supply conduit 132C is a signal flow valve 146C, for the purposes earlier described.

Figure 12:
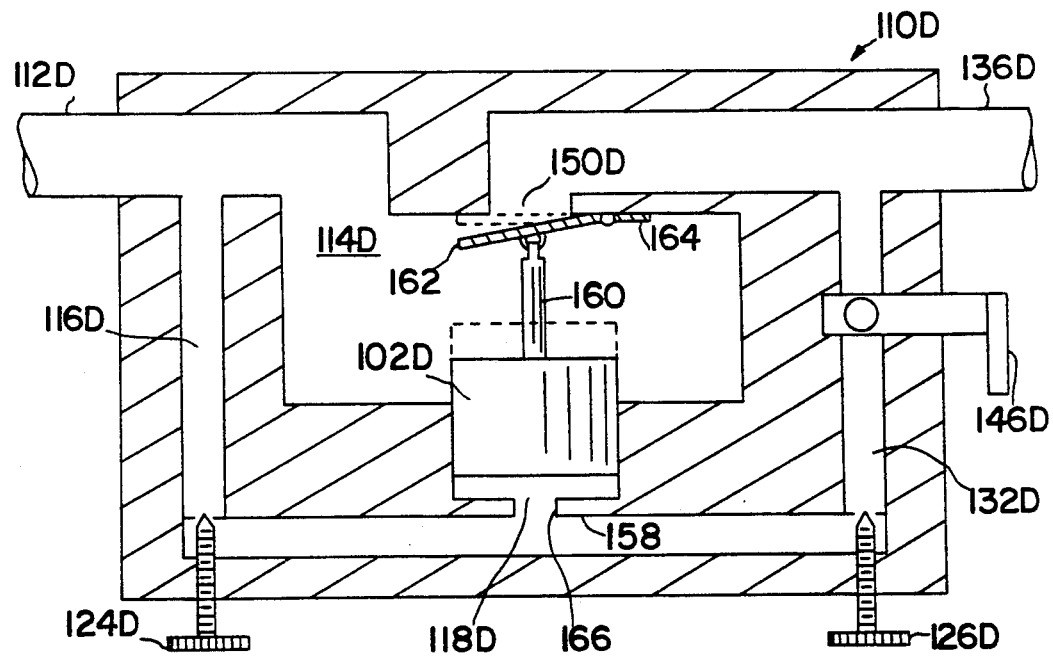
FIG. 12 is another embodiment of a fluid (liquid/gas) flow regulator assembly employing a pair of needle-regulated, adjustable orifices and a hinged-trap actuated by a piston assembly valving means.

Depicted in FIG. 12 is another variable effluent flow rate regulator 110D wherein the valving means 102C of FIG. 11 is further modified (as to the actuation thereof) by free-floating piston 102D. The piston 102D moves in reciprocation within cylindrical guide means 158 having its circumferential sidewall fully enclosing piston 102D. The piston 102D supports an axially-aligned rigid connecting rod 160 operably linked to a hinged closure member 162. The closure member 162 is positioned over the main supply flow outlet port 150D with its fixed portion 164 attached securely to the upper wall of the main inlet chamber 114D. As the piston or valving means 102D travels in reciprocation along its vertical path between its lower and upper stop positions (an intermediate one shown), the closure member 162 moves between the full-flow and the no-flow modes. The intermediate dynamic positions of the piston 102D are a function of the settings of the bypass needle valve 124D and the signal control needle valve 126D, operatively disposed in the bypass conduit 116D and in the signal conduit 132D, respectively. A signal control valve 146D is located in the signal conduit 132D downstream of the signal flow valve 126D, which serves the purposes earlier described. Further, an alternate connection of the bypass and signal flow conduits 116D, 132D to the control chamber 118D is depicted by showing a common port 166 to the control chamber 118D rather than separate ports as in earlier described embodiments.

Figure 13:
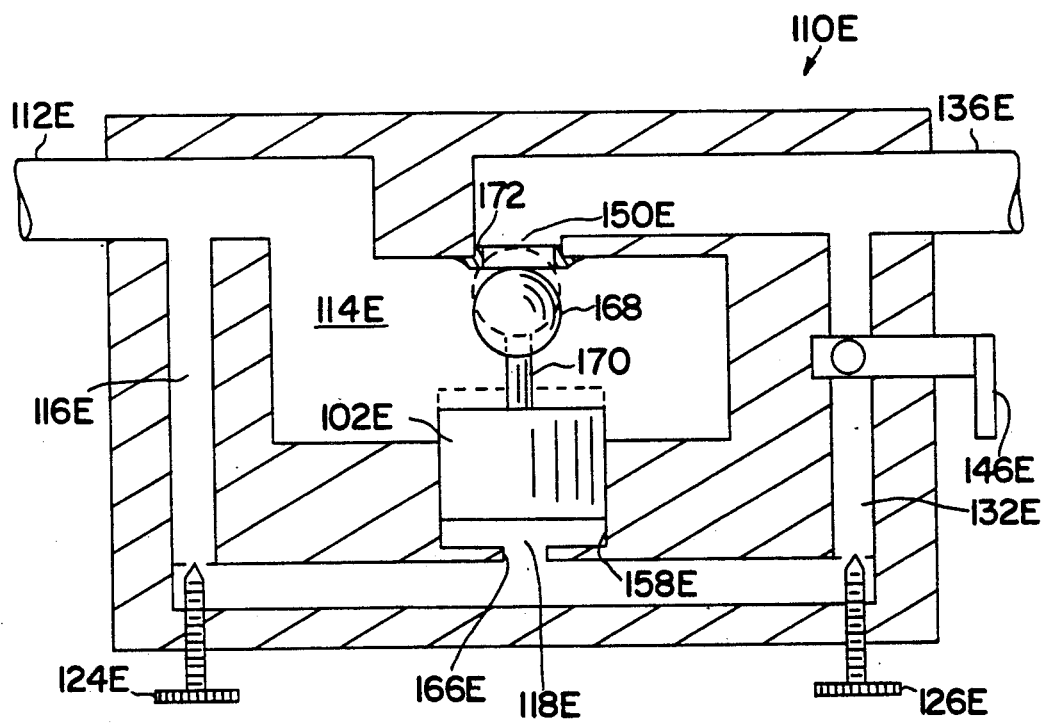
FIG. 13 is another embodiment of a fluid (liquid/gas) flow regulator assembly employing a pair of needle-regulated, adjustable orifices and a reciprocating, piston-mounted rigid sphere valving means.

Shown in FIG. 13 is still another variable effluent flow rate regulator 110E wherein the valving means 102E is further modified to include a ball-type closure means atop the free-floating piston 102E. The piston 102E moves in reciprocation within cylindrical guide means 158E having its circumferential sidewall fully enclosing piston 102E. The piston 102E supports an axially aligned sphere 168 permanently mounted to a rigid connecting rod 170. The sphere 168, at the upper limits of its travel, is adapted to form a sealed closure on a mating seat 172 shaped like a washer-like gasket, which forms the outlet port 150E of inlet chamber 114E. Thusly, the piston 102E travels between the sphere-seated mode of no-fluid flow (shown in phantom) and a sphere-disengaged mode of full-to-partial fluid flow. The intermediate positions of piston 102E and the associated sphere 168, are a function of the settings of the bypass valve 124E and signal flow valve 126E operatively disposed in the bypass conduit 116E and the signal conduit 132E, respectively. In the signal conduit 132E downstream of the signal flow valve 126E there is a signal flow control valve 146E which serves the purposes earlier described. Further, as described above, an alternate connection of the bypass and signal flow conduits 116E, 132E to the control chamber 118E is depicted by showing a common port 166E to the control chamber 118E rather than separate ports as in earlier described embodiments.

Figure 14:
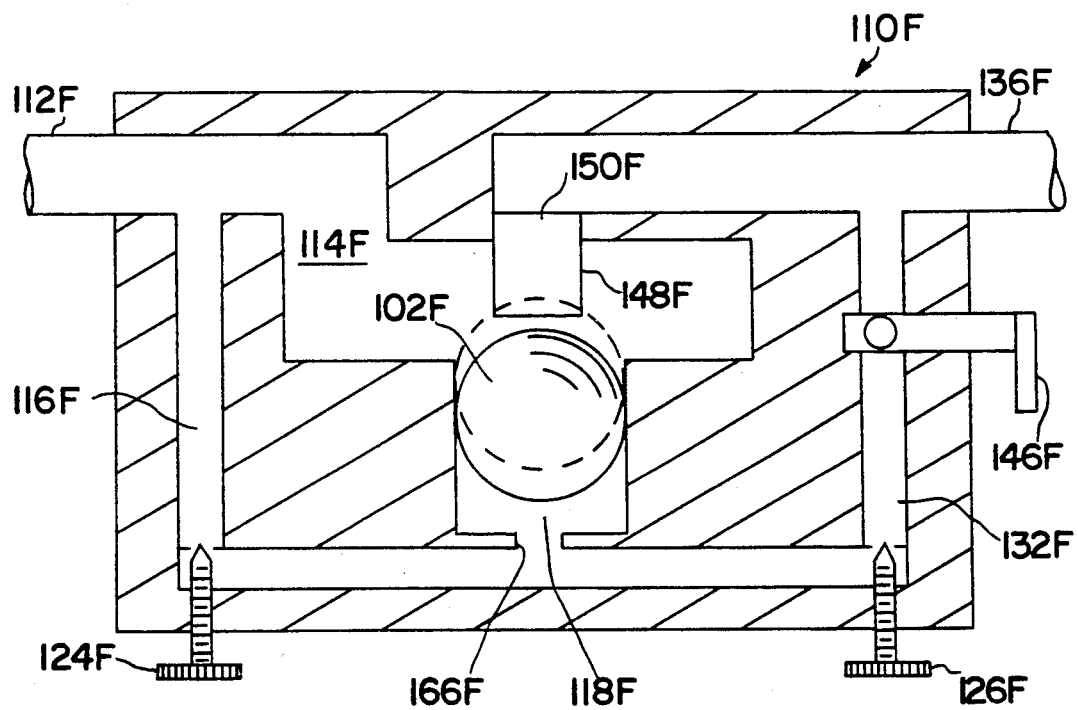
FIG. 14 is another embodiment of a fluid (liquid/gas) flow regulator assembly employing a pair of needle-regulated, adjustable orifices and a free-floating rigid sphere valving means.

Depicted in FIG. 14 is yet another embodiment of a variable effluent flow rate regulator 110F wherein the control valving means is further modified to employ as the fluid exit port 150F, a hollow cylindrical collar 148F that hermetically seals the main flow outlet port 150F. Collar 148F presents a single transverse open end to the inlet chamber 114F for sealing closure against the valving means, a free-floating sphere 102F. In this embodiment, the control chamber 118F is comprised of a cylindrical compartment with its circumferential sidewall enclosing a free-floating rigid sphere 102F, which sidewall acts as a guide means controlling the motion of the sphere. The sphere 102F travels in a reciprocating vertical motion between full-flow and no-flow positions, relevant to the proximal open end of the collar 148F. The valving means of sphere 102F has a seated mode of no-fluid flow (shown in phantom) and a disengaged mode of full-to-partial fluid flow. The intermediate flow positions of the valving means 102F are direct functions of the settings of the bypass valve 124F and the signal flow valve 126F operatively disposed in the bypass conduit 116F and the signal conduit 132F, respectively. Their respective functions are as earlier described. Because of the geometric shape of the valving means, the sphere 102F, there is created a second bypass calibration around the junction of the circumference of the sphere with the compartment sidewall. This peripheral space permits a small amount of fluid to seep through to control chamber 118F augmenting the function of valve 124E. Additionally, the alternate connection of the bypass and signal flow conduits 116F, 132F to the control chamber 118F is depicted by showing a common port 166E to the control chamber 118F.

Figure 15:
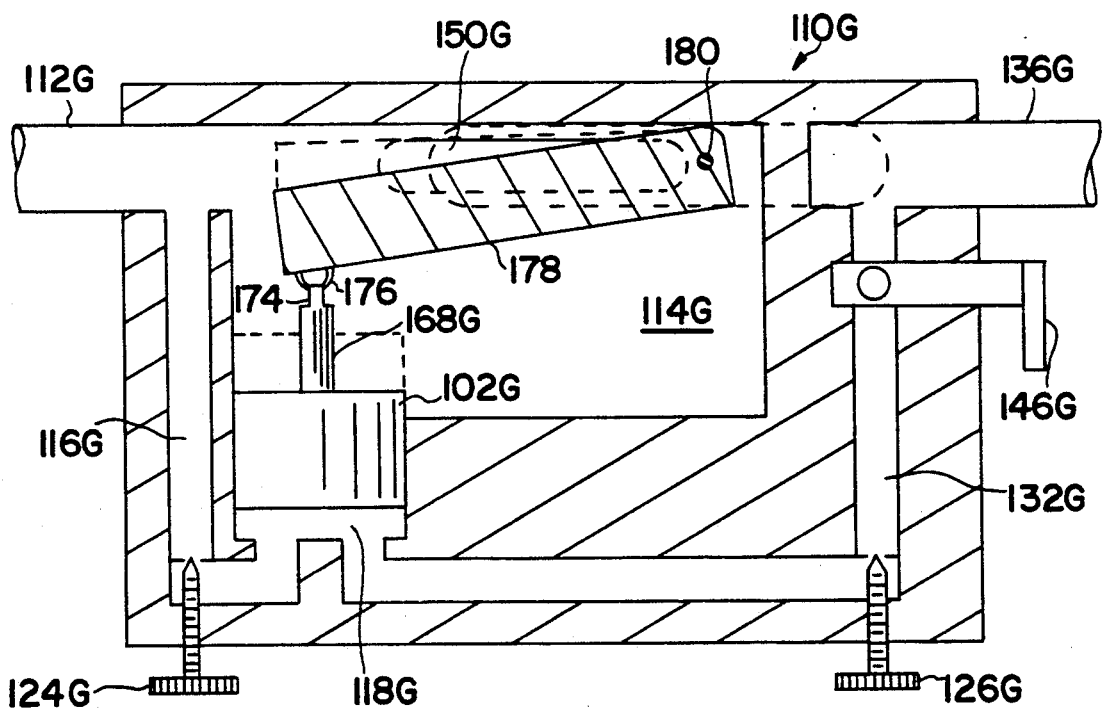
FIG. 15 is another embodiment of a fluid (liquid/gas) flow regulator assembly employing a pair of needle-regulated, adjustable orifices and a hinged planar member port closure means/piston assembly valving means.

Referring to FIG. 15, another variable effluent flow rate regulator 110G is shown wherein the control valving means is further modified to employ another structural configuration for the main fluid outflow. A vertical cylindrical compartment 118G (similar in construction to the control chamber 118A of FIG. 9) has its circumferential sidewall, which acts as a guide means for reciprocal vertical motion, enclosing a free-floating cylindrical piston 102G. The piston 102G supports an axially-aligned rigid upwardly extending rod 168G having a connecting ring 174 at its distal end. Ring 174 connects to a second ring 176 extending downward from a planar closure member 178. The planar closure member 178 extends across an elongated outlet port 150G and is hingably pinned at its distal end to the inlet chamber wall adjacent the outlet port 150G so as to be rotatable about the hinge point 180. Such linkage describes a rotatable closure or valving means utilizing planar member 178 which is interruptably sealable over the elongated outlet port 150G. Hence, the linked structure, the main fluid flow valving means of this embodiment, operates by the cylindrical piston 102G travelling reciprocally between its lowermost and uppermost positions as the coactive associated closure member 178 moves between full-flow and no-flow (shown in phantom) modes. The intermediate flow positions of the cylindrical piston 102G are a function of the settings of the bypass valve 124G and signal valve 126G which are operatively disposed in the bypass conduit 116G and the signal flow conduit 132G, respectively. Their respective functions are as earlier described.

Figure 16:
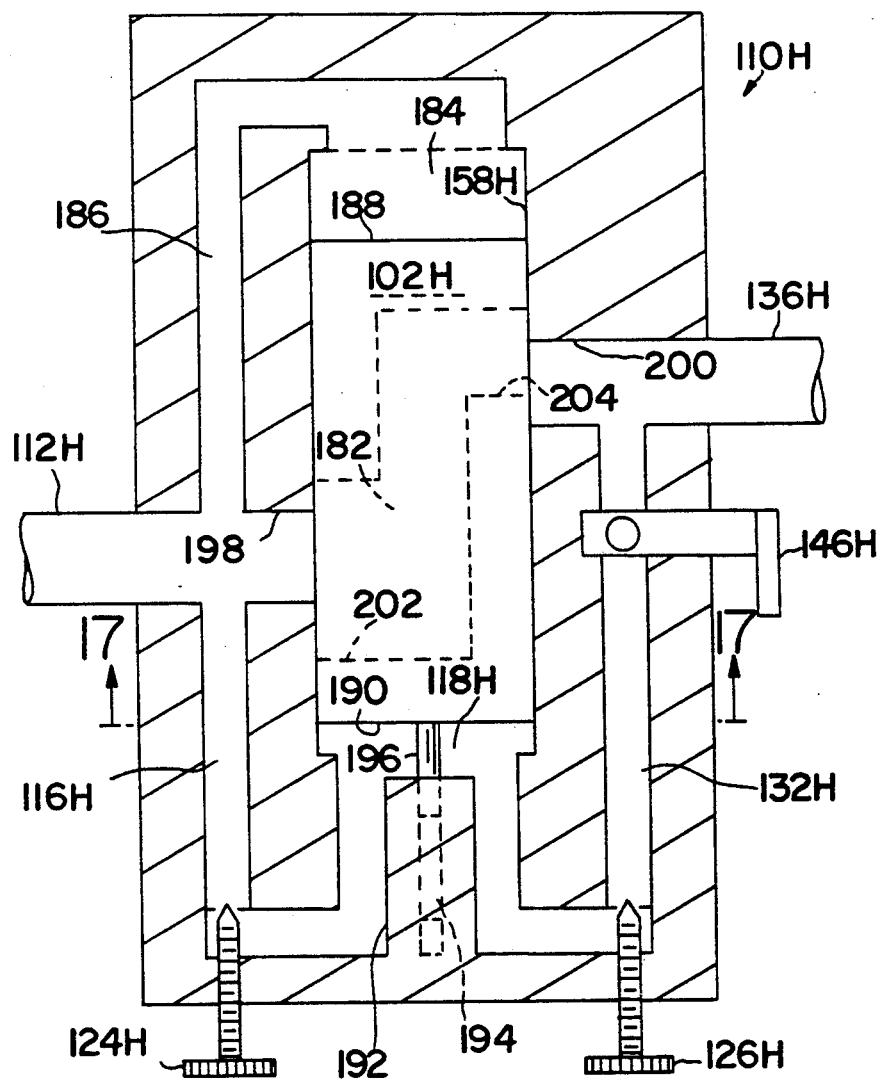
FIG. 16 is another embodiment of a fluid (liquid/gas) flow regulator assembly employing a pair of needle-regulated, adjustable orifices and a floating cylindrical piston with an internal flow passageway valving means.

Still another embodiment of a variable effluent flow rate regulator 110H is depicted in FIG. 16. In this embodiment the control valving means or regulator 110H is modified by employing an elongated cylindrical piston 102H, having a flow conduit 182 positioned therewithin (as a partial main supply conduit), and serving as the operative element of the control valving means 110H. The elongated cylindrical piston 102H is slidingly encased within the circumferential sidewall 158H defining both the main control chamber 118H and the pilot control chamber 184. The main bypass conduit 116H and the pilot bypass conduit 186 diverge from the main supply conduit 112H to exert fluid (liquid/gas) pressure on the opposite end surfaces 188, 190 of the piston 102H. An equilibrium point will be reached depending upon the pressures exerted upon the end surfaces of the piston 102H moving the piston in a reciprocating vertical motion within the sidewall guide means 158H. This action will place the flow conduit 182 in proximal connection with the main fluid supply conduit 112H on the inlet side and the main outlet conduit 136H on the outlet side of the regulator 110H, whether such proximal connection is partial, full or no connection.

In the main bypass conduit 116H, located upstream of the main control chamber 118H, is a bypass control valve 124H. Located downstream of the main control chamber 118H is a signal flow valve 126H. Each of these valves has a similar function to that already repeatedly defined in connection with other embodiments. Also in the signal control conduit 126H is a signal flow control valve 146H having a like function to that already described for this valve.

At the junction of the main bypass conduit 116H and the signal conduit 132H and extending inward into the main control chamber 118H defining two respective ports is a projection 192 having an aperture 194 bored therein in axial alignment with the longitudinal axis of the piston 102H. Located within the aperture 194 is a rod-like guide means 196 extending downward from the bottom surface 190 of the piston 102H, the guide means 196 being permanently axially aligned by affixing same to the piston. Such structure is adapted to accommodate a reciprocating sliding motion along the longitudinal axis of the piston and guide rod assembly so that the flow conduit 182 is placed in partial, full or no connection with the main fluid supply and outlet conduits 112H, 136H.

Piston 102H has a generally cylindrical configuration which houses flow conduit 182. The flow conduit 182 has a double-L shape as the conduit crosses through the piston (as shown with the dotted lines) from one intermediate position 198 along the elongated sidewall to another intermediate position 200 on the diametrically opposite sidewall. The inlet aperture 202 of the flow conduit 182 has a larger diameter than the outlet aperture 204 so that the flow conduit 182 can remain in alignment with the inlet conduit 112H, while the outlet aperture can be interruptably aligned with the outlet conduit 136H in accordance with the position of the piston 102H. The piston 102H travels reciprocally between its lowermost and uppermost positions (an intermediate position is depicted) such that the flow conduit 182 is aligned between the full-flow and the no-flow positions. The intermediate flow position of the piston 102H is a function of the settings of the bypass valve 124H and the signal flow valve 126H disposed in the main bypass and signal flow conduits 116H, 132H, respectively.

Likewise, signal flow control valve 146H, located between the signal flow valve 126H and the main outlet conduit 136H, changes the overall flow rate of the regulator 110H by permitting more or less fluid to flow through the valve 146H based upon its selected positioning. When closed, the valve 146H creates an equilibrium condition in the main control chamber 118H such that the piston 102H rises to its uppermost position closing off the main fluid flow through the flow conduit 182, the outlet aperture 204, and the main outlet conduit 136H. As the valve 146H is opened the pressure exerted on the undersurface 190 of the piston 102H is lessened and the piston 102H sinks downward permitting fluid flow to the main outlet conduit 136H through the flow conduit 182 and the outlet aperture 204. As the signal flow valve 146H is opened wider, the outlet aperture 204 comes into axial alignment with the outlet conduit 136H and fluid flow is maximized.

Figure 17:
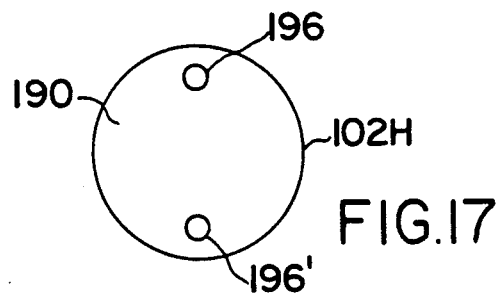
FIG. 17 is a bottom plan view of the piston element of the fluid flow regulator assembly of FIG. 16, taken along line 17—17 of FIG. 16.

In regard to FIG. 17, there is shown the undersurface 190 of the piston 102H. From this viewing point, one can see that the guide rod 196 has a paired guide rod 196' located along a common line approximating a diameter of the piston 102H such that the piston is inhibited from turning about its longitudinal axis during any reciprocating motion initiating or interrupting fluid flow. This, or equivalent, structure is believed required to prevent the piston 102H from rotating on its longitudinal axis preventing the desired alignment of the main fluid supply, flow and main outlet conduits 112H, 182 and 136H, respectively.

Figure 18:
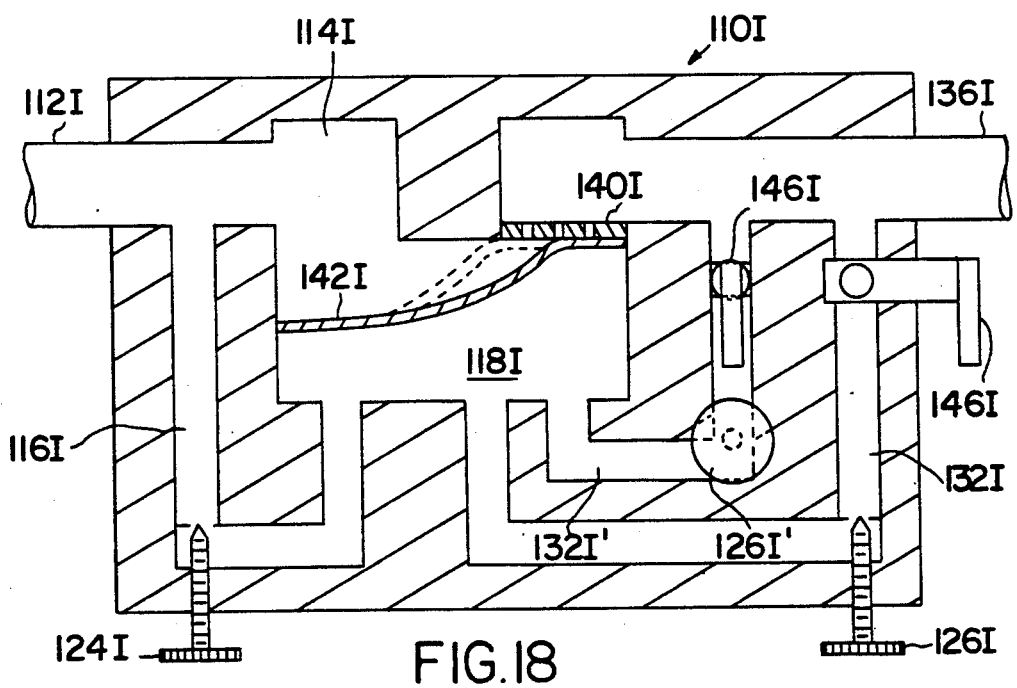
FIG. 18 is another embodiment of a flow regulator assembly employing a flexible membrane/grate and paired needle-regulated, adjustable orifices as shown in FIG. 2, modified to further include a petcock-type valves in the regulator flow outlet lines.

The variable effluent flow rate regulator 110I of FIG. 18 is quite similar to that of FIG. 8 wherein the regulator valving means comprises a perforated support plate 140I and a cooperating flexible sealing membrane 142I. Regulator 110I is also modified to provide dual signal flow conduits 132I and 132I' both of which communicate directly with the main outlet conduit 136I. A second signal flow valve 126I' and signal flow control valve 146I' are located in the second signal conduit 132I'. Each of these named valves have the same functions as previously described in connection with other embodiments. The second signal conduit 132I' and the associated valves 126I' and 146I' create a secondary flow rate through the regulator 110I even though the primary signal flow conduit 132I may be closed off by signal flow control valve 146I. Hence, an additive or subtractive function affecting the flow rate can be preset using the regulator of this embodiment. Such effect may be described as increasing the flow rate by the setting of one of the signal control valves 146I, 146I'. Alternatively, the flow rate can be lessened by turning off one of these valves. This effect can be accomplished as many times as desired simply by adding additional signal flow conduits and associated valving means between the main control chamber 118I and the main outlet conduit 136I.

As an example, the signal flow valve 126I can be set at a greater value than signal flow valve 126I'. When the valve 126I' is turned on, the fluid flow is increased by the value set on that valves 146I, 146I') then turning one valve off, 126I, will decrease the fluid flow by the value set on said valve.

Figure 19:
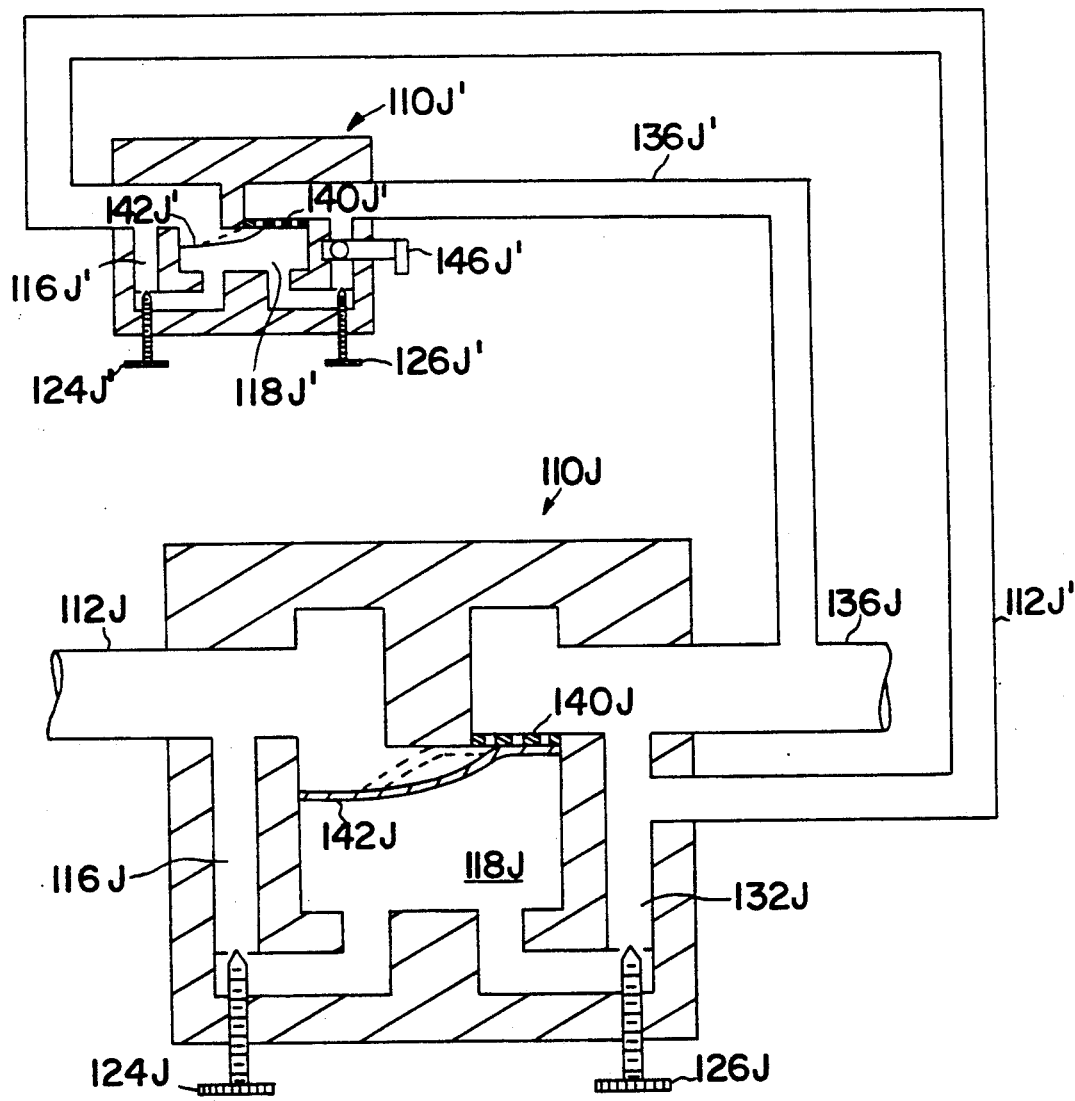
FIG. 19 is a dual-stage, flow regulator assembly having a smaller regulator assembly serving to regulate the operation of a larger flow regulator with the membrane-controlled/grate valving means of FIG. 2.

In FIG. 19 there is shown a pair of variable effluent flow rate regulators 110J and 110J', each configured and operated identically to the description presented with regard to FIG. 8. Regulator 110J' has its main fluid supply conduit 112J' connected operatively to the signal flow conduit 132J at the point where the signal flow control valve would be placed. Additionally, the main outlet conduit 136J' of the regulator 110J' is connected to the main outlet conduit 136I of regulator 110J. The principal distinction of the two regulators 110J and 110J' is that regulator 110J has an appreciably larger fluid flow capacity. This tandem relation functions so that the flow regulator or controller 110J' serves as a pilot controller means for the second, larger flow regulator or controller 110J by being substituted for the signal flow control valve 146. Any number of pilot controllers may be used to control larger fluid flows.

Figure 20:
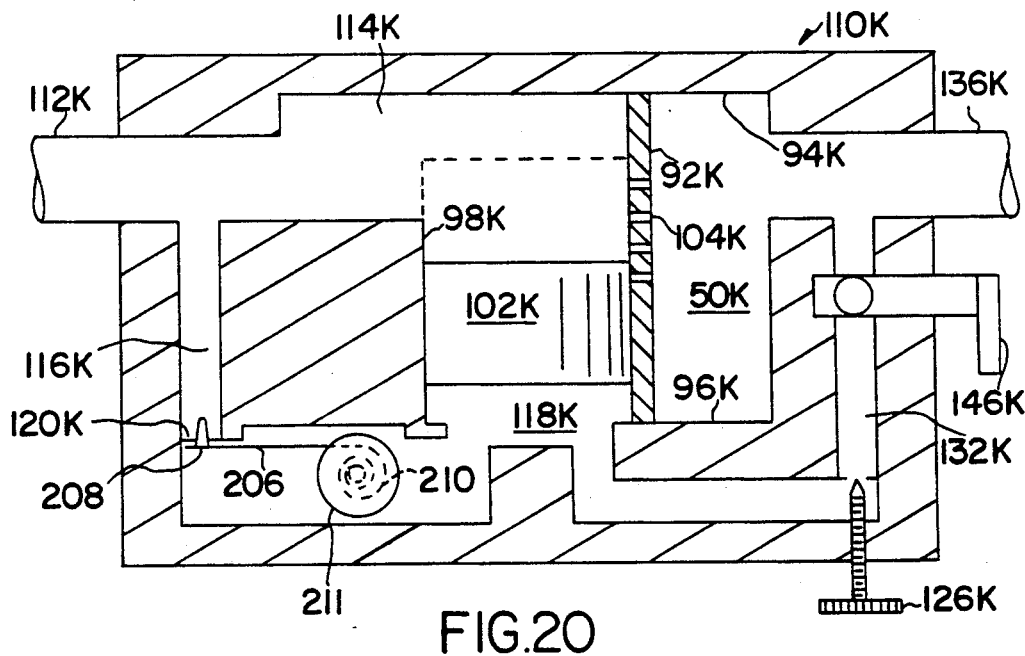
FIG. 20 is another embodiment of a fluid (liquid/gas) flow regulator assembly employing a needle-regulated, adjustable orifice, a reciprocating piston means as the main flow valving means, and a temperature responsive valve for regulating the fluid inflow of the bypass conduit for calibrating the valving means.

In FIG. 20 there is shown a variable effluent flow rate regulator 110K adapted for use in a varying temperature fluid supply condition to regulate the fluid flow dependent upon the perceived temperature. Regulator 110K is adapted to be responsive to variations in main supply line ambient temperature.

Referring now to FIG. 20, the embodiment of the controller 110K is a modification of the structural configuration of the embodiment described of FIG. 9. In the controller 110K the bypass control valve 124 is replaced with a thermally responsive valve 206 having a cone tipped valving member 208 located within the orifice 120K for regulating the fluid flow in the bypass conduit 116K. Variations in temperature of the fluid flowing in the bypass conduit 116K alters the flow through the bypass control valve 206, as will be described.

When the controller 110K is paired with another regulator (not shown) and is functioning in the fluid mixing valve mode of FIG. 1, the thermally responsive valve 206 senses the ambient temperature, and changes in that temperature, of the fluid in the bypass conduit 116K using a temperature sensing device such as the coiled bi-metallic strips 210. Sensing temperature change is well known among persons skilled in the art and other pre-calibrated temperature sensing devices can be used for achieving the same result without departing from the invention. The sensing device 210 will detect the change in temperature and automatically cause the bypass control valve 206 to compensate for the temperature change by moving the valve member 208 into or out of the orifice 120K to maintain the main fluid flow output rate. The main flow rate is initially governed by the particular setting of the signal flow valve 126K located in the signal flow control conduit 132K.

The piston-type main valving means of FIG. 20 is the functional equivalent of the valving means described in connection with FIG. 9. An internal curvilinear partition wall 92K bridges the upper and lower walls 94K, 96K of the regulator 110K. Located with the curvilinear wall 92K are multiple perforations 104K which serve as the valving means in cooperation with the piston 102K. These perforations 104K are located in the upper section of wall 92K and act as the main fluid supply outflow ports. The internal curvilinear wall 92K, as a part of the main valving means, also serves to separate the inlet and outlet chambers connected to the main fluid supply conduit 112K and the main outlet conduit 136K.

The internal wall 92K and opposite sidewall 98K define the main control chamber 118K in which the free-floating cylindrical disc-like piston 102K is located. The piston 102K is capable of reciprocal vertical motion within the walls 92K, 98K in accordance with the pressures exerted upon its opposite faces. The position of piston 102K is controlled by the fluid pressure exerted upon its undersurface in the main control chamber 118K. Fluid pressure control valve (as, in this case, said valve responds to changes in temperature) in cooperation with the signal flow control valve 146K. This permits a controlled, temperature varied flow from the main fluid supply conduit 112K through the inlet chamber 114K, and out through flow ports 104K to the outlet chamber 50K and out through the main outlet conduit 136K.

In this embodiment, while working as a cold fluid valve, output volume of cold liquid is reduced proportionally as the liquid temperature gets colder because the thermally responsive bi-metallic coil or sensing means 210 contracts, biasing the cone-tipped valve member 208 outward from the flow orifice 120K. Increasing flow through orifice 120K raises the fluid pressure in the main control chamber 118K, causing an upward movement of the piston 102K and partial throttling of the main flow through ports 104K to the outlet conduit 136K. Knob 211 is supplied to calibrate the sensing means 210 to effect the thermal control over the fluid flow.

Coupling of this cold flow controller with a flow controller for hotter liquid (not shown), and having identical thermally responsive bypass valve means to respond to variations in fluid temperature, the volume of mixed fluid output would be lessened. However, the overall temperature of the mixed fluid would remain relatively constant, despite temperature variations in the dual fluid feed conduits. For example, for fluid temperature increases on the "hot" fluid side, the thermally responsive valve means would cause the valve to move in the direction that decreases output of hotter fluid flow. Similarly, in the case of "hot" or "cold" fluids, the mixed flow would be increased overall, should the supply fluid temperature change in the reverse direction.

In order to maintain constant volume for a mixed flow, the regulator 110K can have a preset flow rate. This can be accomplished by placing a signal flow control valve 146K in the signal flow conduit 132K connected between the main control chamber 118K and the main outlet conduit 136K. Associated with the signal flow control valve 146K is a signal flow valve 126K which serves to manually set the intended volume or rate of the fluid flow. The signal flow control valve 146K serves to initiate and control the flow of the fluid up to the preset maximum flow rate set by the signal control valve 126K, just as described in connection with other embodiments presented previously.

In operation, paired cold and hot flow controllers, with both having the configuration of FIG. 20, the thermally responsive bypass control valve 206 would open up the bypass flow through the orifice 120K if the "cold" stream side dropped its temperature drastically. This would cause the piston 102K to find a new equilibrium position. The increase in the flow in the bypass conduit would cause a partial closure of the outflow ports 104K as the piston 102K rose upward in response to the increased fluid pressure in the main control chamber 118K. Similarly, if the "hot" stream side dropped in temperature drastically, a similar throttling effect would occur.

As in all the flow controllers, a manually adjustable knob is located external of the valve body being pinned to an adjustable depth needle for calibrating and/or setting the desired flow temperature or, if the fluid is a gas, pressure. In use, one such assembly may be used independently to regulate temperature variations, such as those encountered in, but not limited to liquid coolant systems and air conditioning situations.

Figure 21:
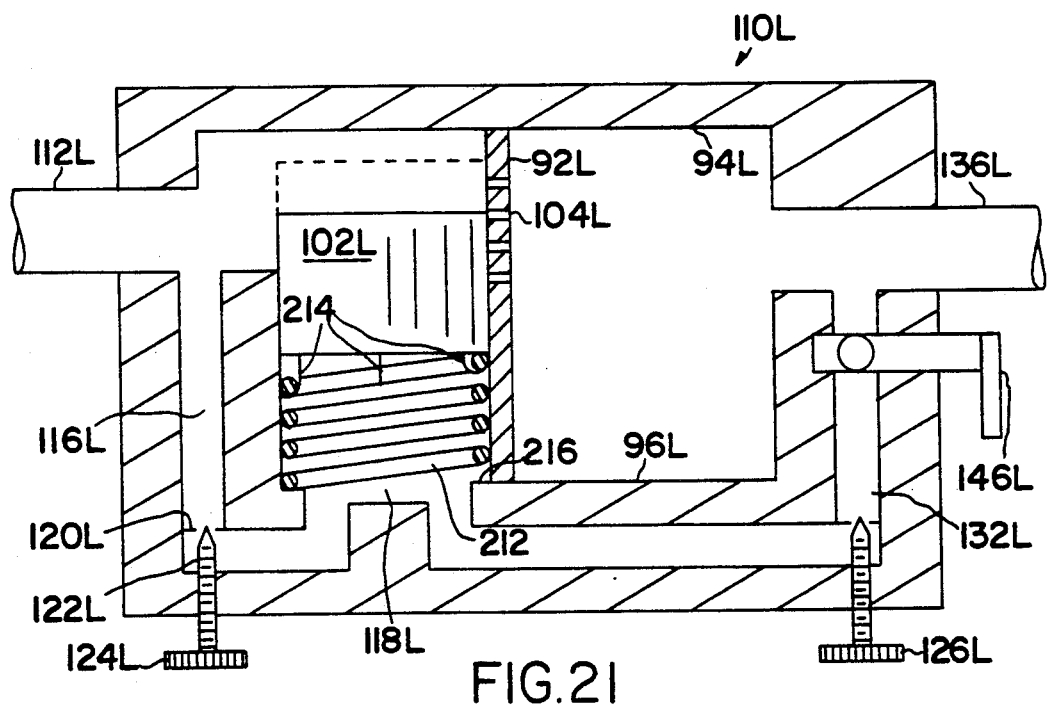
FIG. 21 is another embodiment of a fluid (liquid/gas) flow regulator assembly employing a pair of needle-regulated, adjustable orifices and a spring-biased, reciprocating piston means as the main flow valving means.

The flow controller of FIG. 21 is configured substantially like that described in connection with FIG. 9, except that a coiled spring element 212 is operatively associated with the piston 102L. Fluid inflow stream splitting occurs as in FIG. 9 with the main fluid flow being controlled and throttled by the vertical position of piston 102L, relative to plural outflow ports 104L. The spring means 212 is peripherally affixed to the underside of the piston 102L by an annular attachment means 214. The spring means 212 is positioned below the piston 102L and within the curvilinear space defined by sidewalls 92L and 98L. The upwardly biasing spring means 212 is adapted for the purpose of sensing changes in fluid line pressure, and also for altering the sensitivity of the signal control valve 126L. Spring means 212 is also anchored on lower peripheral shoulder 216 of main control chamber 118L. The spring means is variably compressed by the weight of piston 102L coupled with the fluid pressure exerted on the upper surface of the piston 102L. The spring constant k of the spring means 212 is calculated to allow for the compression of the spring means to permit the desired fluid flow and to enhance the shutoff of said flow in extreme temperature and pressure gradients.

The upward bias of the spring means 212 tends to seal off the sidewall ports 104L and, hence, will augment the tendency for piston 102L to close off the main fluid flow in the event of back-pressure surges occurring in either the bypass or signal control conduits 124L, 126L. The bias will also inhibit the effect of fluids backing up into or flowing in reverse through the controller 110L.

When the bypass control valve 124L is set or reset, the translational motion of the associated threaded needle 122L will cause the piston 102L to alter its position, providing a finer adjustment for the main fluid flow through the controller 110L. The effect of constricting the bypass fluid flow through the orifice 120L will cause the piston 102L to travel downwardly exposing a greater number of the main outflow ports 104L. Also causing an effect on the position of the piston is the signal control valve 126L and the signal flow control valve 146L. The opening, even partially, of the signal flow control valve 146L will decrease the pressure exerted on the underside of the piston 102L in the main control chamber 118L causing the piston 102L to reposition itself lower again exposing a greater number of main outflow ports 104L. When the reverse occurs, the closing or partial closing of the signal flow control valve 146L, the piston 102L will move upward closing off or partially interrupting the main fluid flow through the outflow ports 104L. Use of the spring biasing means 212 will confer a tendency on the main valving means of the controller 110L to be increasingly sensitive to minor variations in fluid and line pressures such that even small translational movement of the valves 124L, 126L and 146L will cause a significant reaction and modification of position by the piston 102L.

Conversely, a spring means 212 which is normally constricted will confer a tendency on the main valving means to be less sensitive to minor variations in movement of the signal flow and control valves 126L, 146L. In this case a significant change in position of the valve 126L, 146L will cause only a slight variation in the flow controlling the spring means/piston 212, 102L.

Figure 22:
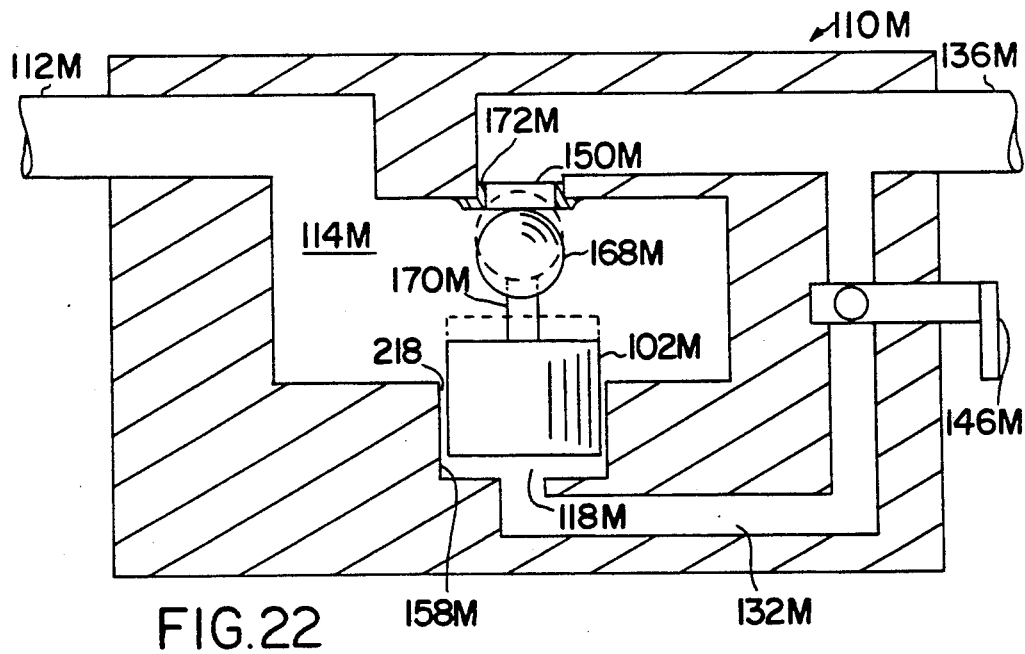
FIG. 22 is another embodiment of a fluid (liquid/gas) flow regulator assembly employing a reciprocating, piston-mounted rigid sphere valving means as shown in FIG. 13, but omitting the paired needle-regulated orifices.

Lastly, another embodiment for a flow controller 110L is depicted in FIG. 22. This controller 110L is quite similar to that shown in FIG. 13, but simplified to a limited extent. The significant differences with the controller 110L are the omission of the bypass control and signal control valves 124 and 126 and the bypass conduit 116. As in the embodiment described in connection with FIG. 13, a free-floating piston 102M moves reciprocation within cylindrical guide means 158M having its circumferential sidewall fully enclosing piston 102M. The piston 102M supports an axially aligned sphere 168M permanently mounted to a rigid connecting rod 170M. The sphere 168M, at the upper limits of its travel, is adapted to form a sealed closure on a mating seat 172M shaped like a washer-like gasket, which forms the outlet port 150M of inlet chamber 114M. Thusly, the piston 102M travels between the sphere-seated mode of no-fluid flow (shown in phantom) and a sphere-disengaged mode of full-to-partial fluid flow controlling the main supply flow rate through flow controller 110M.

An unregulated bypass fluid flow is created around and circulating below piston 102M by a peripheral gap or spacing 218 provided by the slightly smaller outside dimension of the piston 102M and the sidewall 158M of the chamber 118M. This bypass flow provides an unregulated equilibrium pressure above and below the piston 102M when the signal flow control valve 146M is closed sealing of the main fluid flow through the main outlet port 150M. As described previously, the signal flow control valve 146M allows direct control of the piston-type main valving means by merely changing its position. Closing, or partial closing, of the valve 146M causes a throttling effect of the bypass/signal fluid flow such that the piston/sphere 102M/168M begins to seat against the mating seat 172M and close off the main fluid supply. The tolerance of the peripheral gap or spacing between the piston 102M and the walls of the main control chamber 118M, coupled with the position of the valve 146M, achieve the desired fluid flow control even though the fineness of such control over the fluid flow may have been diminished slightly.

Each of the foregoing described embodiments of variable effluent flow fluid regulators may be utilized in the console assembly of the present invention (as shown in FIG. 1) with the associated flow controller understood to serve the same purpose as the signal flow control valves. The number of levels would depend only upon the desired number of paired regulators required for a specific function. The fluid exit conduits of each regulator would still need to have a check valve associated therewith, and flow would be into a mixing chamber and through the combined flow outlet spigot to the desired application or use. Alternatively, each of the regulators described could be used singly to achieve controlled flow of a desired fluid as described above.

The present invention may be embodied in other specific forms without departing from the spirit or essential attributes thereof, and accordingly, reference should be made to the appended claims, rather than to the foregoing specifications, as indicating the scope of the invention.

I claim:

1. A plural station, fluid flow rate and temperature control console adapted for cooperating with the standing pneumatic/hydraulic pressure of a dual temperature fluid supply means, comprising:
   (a) two main fluid supply conduits, a single fluid exit conduit interruptably connectable to both of said supply conduits, a variable affluent flow rate regulator interposed in each of the said main supply conduits, a bypass fluid supply conduit operably connected to each of the main fluid supply conduits and to the interposed flow rate regulators, an ancillary fluid outlet conduit connected to each regulator and serving as a signal control fluid supply means, and at least one associated controller means for presetting the flow rate through each regulator and determining both the degree of mixing and the incidence of the fluid flow to be provided from said supply conduits to the exit conduit;
   (b) each of the flow rate regulators comprising a rigid fluid-impermeable main chamber connecting at a first section thereof with one of the main fluid supply conduits and with said fluid exit conduit, said bypass fluid supply conduit being operably connected between each of said main supply conduits and a second section of the main chamber of the interposed flow rate regulators;
   (c) said main chamber having a first fluid valving means comprising one or more flow control ports upstream of said fluid exit conduit, a variable position flow closure means separating said first and second sections of said main chamber and adapted for effecting reciprocating valving motion across said flow control ports ranging between a full-flow and no-flow position responsive to the differential pressures created on the opposite sides of said flow closure means by the dissimilar flow pressures exerted from the main fluid supply conduit and the bypass fluid supply conduit;
   (b) a manually adjustable needle valve located in the bypass fluid supply conduit of each flow rate regulator for purposes of calibrating the desired pressure drop occurring in the supply fluid passing therethrough to the second section of the main chamber of each regulator, which supply fluid exerts pressure on the undersurface of the flow closure means;
   (e) said at least one associated controller means is adapted for setting the regulator main flow rate comprising a first multisetting flow valve means disposed downstream in the signal control fluid supply means disposed downstream in the signal control fluid supply means, and a second valving means connectably disposed downstream of the first multisetting valve means and being adapted to only "ON" or "OFF" modes of operation, said second valving means also being connected to a second companion multisetting flow valve means associated with the other signal control fluid supply means of the other flow rate regulator and also to said main exit conduit, and serving as a common signal flow control valve for the mixed fluid streams.

2. The console assembly of claim 1 wherein said flow closure means comprises a flexible, fluid-impermeable membrane securely arranged across such said main chamber.

3. The associated controller means of claim 1 comprising a manually adjustable, needle-like throttle and orifice type valve with plural settings ranging from minimal signal fluid flow to full signal fluid flow therethrough.

4. The associated controller means of claim 1 wherein said second valving means has a manually accessible knob for rotating the valve body between its flow and no flow modes on demand.

5. The console assembly of claim 1 wherein there are at least two levels of associated controller means for setting the dual controller fluid flow rate, each level comprising two substantially identical multisetting flow valves and a single second valve means which is concurrently connected to the outlet conduits of said multisettable valves, the second valve also being operably connected with the main exit conduit of said console assembly.

6. The console assembly of claim 1 wherein one main supply conduit provides heated water adapted for residential use and the other main supply conduit provides cold water, the dissimilar water temperatures being adapted in the console assembly to a variety of use conditions, selectable when a specific ON/OFF control is activated.

7. The console assembly of claim 1 wherein one main supply conduit provides on mixable gas and the other main supply provides another mixable gas, both gases being of substantially equal pressures, the gases being mixed in the console assembly in desired proportions for a variety of use conditions, selectable when a specific ON/OFF control is activated.

8. The console assembly of claim 2 wherein the flexible impermeable member is composed of an elastomeric material resistant to extreme fluid temperatures and to cyclical seating, said flexible impermeable member being responsive to multiple pressure differentials exerted thereon.

9. A variable affluent flow rate regulator adapted for insertion into a fluid supply conduit to regulate the fluid flow therethrough and being responsive to variations in main supply line hydraulic fluid or pneumatic gas pressures in the main supply line comprising:
   (a) a rigid fluid-impermeable main chamber connecting at a first section thereof with a main fluid supply conduit, and also with the fluid exit conduit;
   (b) a bypass fluid supply conduit operably connected at one end to the main fluid supply conduit and at its other end to a second section of said main chamber;
   (c) said main chamber having a first fluid valving means comprising one or more flow control ports intermediate said fluid supply and said fluid exit conduits, a variable position flow closure means separating said first and second sections of said main chamber and adapted for effecting reciprocating valving motion across said flow control ports, ranging between a full-flow and no-flow position responsive to the differential pressures created on the opposite sides of said flow closure means by the dissimilar flow pressures exerted from the main fluid supply conduit and the bypass fluid supply conduit;

(d) a first manually adjustable, needle valve located in the bypass fluid supply conduit upstream of the first fluid valving means for controlling the bypass fluid flow to said first valving means; and (e) a second manually adjustable, needle valve means located in the signal flow conduit downstream of said first valving means and a second valving means connectably disposed downstream of said needle valve means and being adapted for ON and OFF modes of operation for setting the main fluid flow rate in the fluid exit conduit by varying the pressure exerted on the first valving means in conjunction with the main fluid supply and the bypass fluid supply.

10. The flow rate regulator of claim 9 wherein said flow closure means comprise a flexible, fluid-impermeable membrane securely arranged across such said main chamber.

* * * * *